United States Patent Office 3,734,960
Patented May 22, 1973

---

3,734,960
SYNTHESIS OF ORGANIC SULFONYL CYANIDES
R. Garth Pews and Fred P. Corson, Midland, Mich., assignors to The Dow Chemical Company, Midland, Mich.
No Drawing. Filed Aug. 4, 1969, Ser. No. 847,455
Int. Cl. C07c *161/00*
U.S. Cl. 260—545 R                                              4 Claims

ABSTRACT OF THE DISCLOSURE

Organic thiocyanates are reacted under essentially anhydrous conditions in the liquid phase with an organic peracid oxidizing agent to produce the corresponding sulfonyl cyanide.

---

BACKGROUND OF THE INVENTION

Van Leusen et al. in Chemical Communications, 1968, 440, teach the preparation of p-toluenesulfonyl cyanide by a multi-step process going through the intermediate p-toluenesulfonylmethylenetriphenylphosphorane. It was also reported that sulfonyl cyanides could not be prepared by the oxidation of thiocyanates.

SUMMARY OF THE INVENTION

According to the present invention and contrary to the art, organic thiocyanates are oxidized by an organic peracid oxidizing agent under essentially anhydrous conditions in the liquid phase to produce the corresponding sulfonyl cyanide.

Any aliphatic, aromatic or heterocyclic thiocyanate may suitably be used in the present invention, with those thiocyanates having up to 20 carbons being preferred. For the purposes of the invention, the aromatic thiocyanates are defined as those which have the thiocyanate group attached directly to the aromatic nucleus. Representative examples of suitable thiocyanates include: aliphatic hydrocarbon thiocyanates such as ethyl thiocyanate, pentyl thiocyanate and nonyl thiocyanate; substituted aliphatic hydrocarbon thiocyanates such as 2-chloro-1-butyl thiocyanate, 2-hydroxyethyl thiocyanate and 5-nitro-1-hexyl thiocyanate; aromatic hydrocarbon thiocyanates such as phenyl thiocyanate, naphthyl thiocyanate, o-tolyl thiocyanate, p-ethylphenyl thiocyanate; substituted aromatic thiocyanates such as m-chlorophenyl thiocyanate, p-nitrophenyl thiocyanate, p-hydroxyphenyl thiocyanate, p-cyanophenyl thiocyanate and m-thiocyanato benzoic acid; and heterocyclic thiocyanates such as pyridyl thiocyanate, thiocyanato furan and thiocyanato thiophene. Of these thiocyanates, hydrocarbon thiocyanates having up to about 10 carbon atoms are preferred.

Although many peracids are suitable oxidizing agents, the choice of desirable peracids in practice is limited by the relative stability of the peracid selected. Also, since the reaction must be run in an essentially anhydrous medium, aqueous peracids are ineffective. Representative examples of organic peracids suitable in the present invention include: peracetic acid, perbenzoic acid, m-chloroperbenzoic acid, monoperphthalic acid and p-chloromonoperphthalic acid. Of the organic peracids that may be used to oxidize the thiocyanates, m-chloroperbenzoic acid is preferred.

Although the relative proportions of the thiocyanate and organic peracid may vary widely, a stoichiometric excess of the peracid is preferably employed. In a stoichiometric reaction, two moles of organic peracid react with one mole of the thiocyanate to produce the sulfonyl cyanide. For aromatic thiocyanates, a 5 to 50% excess of the organic peracid is generally employed, with about a 20 to 40% excess being preferred. For aliphatic thiocyanates, a greater excess is ordinarily required. Most conveniently, the progress of the reaction is observed by infrared spectroscopy and the addition of peracid is terminated when no thiocyanate remains in the reaction mixture. Usually, a 100 to 300% stoichiometric excess is required.

Because of the nature of the reactants, a suitable solvent is generally employed. Such solvent may be any solvent which is essentially inert to the reaction and in which both of the reactants are at least partially soluble. Representative examples of such solvents include: lower alkyl nitriles, ethers, liquid hydrocarbons, halogenated benzene and nitromethane.

The reaction is conducted under anhydrous conditions because the presence of water appears to hydrolyze the sulfonyl cyanide to the sulfonate substantially as it is formed. In spite of this fact, minor amounts of water may be present during the reaction with somewhat reduced yields, but conducting the reaction under anhydrous conditions is preferred.

The temperature of the reaction may vary widely. Suitably temperatures from about 10° to about 100° C. or more may be used in the reaction. The reactions at temperatures below this level are generally too slow, whereas at reaction temperatures about 100° C., some of the organic peracids are relatively unstable.

The process of the present invention provides a convenient and rapid method of preparing sulfonyl cyanides. The sulfonyl cyanides prepared by the present invention are useful for producing alkyl or aryl nitriles by reacting the sulfonyl cyanide with the appropriate Grignard reagent. The aromatic sulfonyl cyanides of the present invention may also be reacted with 5,5-dimethoxycyclopentadiene to produce picolinates.

SPECIFIC EMBODIMENTS

EXAMPLE 1

Preparation of p-toluenesulfonyl cyanide

A mixture of 15.1 grams of 80% m-chloroperbenzoic acid in m-chlorobenzoic acid, 5 grams of p-tolyl thiocyanate and 200 ml. of hexane was stirred at 60° C. for 20 hours. The reaction mixture was filtered and the filtrate was concentrated by evaporation. The resulting residue was dissolved in 10 ml. of benzene and chromatographed over 50 g. of silica gel using benzene as an elutant. The benzene was removed from the first 200 ml. of fraction, and the residue was crystallized from hexane to yield 4.7 g. of p-toluenesulfonyl cyanide, a 79% yield based on the p-tolyl thiocyanate employed in the reaction. The identity of the product was determined by infrared spectroscopy, mass spectroscopy, and nuclear magnetic resonance spectroscopy.

EXAMPLE 2

Preparation of ethanesulfonyl cyanide

A mixture of 127 g. of 80% m-chloroperbenzoic acid (0.84 mole) in m-chlorobenzoic acid and 26.1 g. of ethyl thiocyanate (0.3 mole) in 1200 ml. of hexane was stirred at 25° C. for 24 hours. Since infrared analysis showed approximately 50% conversion, an additional 127 g. of 80% m-chloroperbenzoic acid was added at this time and the mixture was stirred for another 24 hours at 25° C. The hexane was removed by evaporation, the residue of 4.9 g. was dissolved in 10 ml. of benzene and the solution was chromatographed over 50 g. of silica gel using benzene as the elutant. Removal of benzene from the third and fourth 50 ml. fractions gave 2.1 g. of ethanesulfonyl cyanide, a 5.9% yield. The product was identified by infrared spectroscopy and had a boiling point of 65° to 67° C. at 3.1 mm. Hg.

In the same manner as shown by the above examples, p-chlorophenyl thiocyanate, p-nitrophenyl thiocyanate, phenyl thiocyanate, naphthyl thiocyanate, 2-chlorohexyl thiocyanate and pyridyl thiocyanate may be reacted with m-chloroperbenzoic acid to give the corresponding sulfonyl cyanides. Also in the same manner as shown above, other organic peracids, such as peracetic acid and monoperphthalic acid may be used to convert the thiocyanates above to the corresponding sulfonyl cyanides.

We claim:

1. A process for preparing organic sulfonyl cyanides comprising reacting by contacting an organic thiocyanate selected from the group consisting essentially of aliphatic and aromatic hydrocarbon thiocyanates having up to 10 carbon atoms in the liquid phase in the presence of an inert solvent with a stoichiometric excess of an organic peracid under essentially anhydrous conditions and separating the organic sulfonyl cyanide product from the reaction mixture thereby obtained.

2. The process of claim 1 wherein the thiocyanate is p-tolyl thiocyanate or ethyl thiocyanate.

3. The process of claim 1 wherein the peracid is m-chloroperbenzoic acid.

4. The process of claim 1 wherein the temperature is 10° to 100° C.

References Cited

UNITED STATES PATENTS 3,501,514   3/1970   Grimm et al. _____ 260—400

OTHER REFERENCES

Bohme et al.: Chem. Ber. 100, 347 (1967).

LORRAINE A. WEINBERGER, Primary Examiner

R. GERSTL, Assistant Examiner

U.S. Cl. X.R.

260—294.8 R, 329 S, 347.2, 465 R, 465.1